Patented Apr. 18, 1933　　　　　　　　　　　　　　　1,904,229

UNITED STATES PATENT OFFICE

WINFRID HENTRICH, OF LEVERKUSEN-ON-THE-RHINE, AND JOSEF HILGER, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

2.4-DI-(NITROPHENYL)-6-HALOGEN-1.3.5-TRIAZINES AND METHOD OF MAKING THE SAME

No Drawing. Application filed May 6, 1930, Serial No. 450,307, and in Germany May 7, 1929.

The present invention relates to 2.4-di-(nitrophenyl)-6-halogen-1.3.5-triazines and to a process of preparing same, more particularly it relates to compounds of the probable general formula:

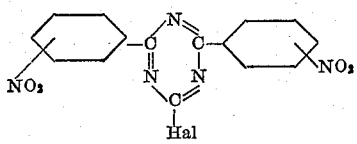

wherein "Hal" stands for a halogen atom and wherein the benzene nuclei may be further substituted by alkyl, alkyloxy or halogen.

Our new compounds are obtainable by heating a 2.4-di-(nitrophenyl)-6-hydroxy-1.3.5-triazine with a phosphorus halide, for example by heating with phosphorus oxychloride or with phosphorus pentabromide, for several hours between about 100 and 150° C.

As regards the starting materials for the process of the invention the method of preparing the same is described in literature, for example the 2.4-di-(3'-nitrophenyl)-6-hydroxy-1.3.5-triazine in "Berichte der Deutschen Chemischen Gesellschaft," vol. 28, (1895), page 482. The corresponding di-(4'-nitrophenyl) compound is described in Berichte der Deutschen Chemischen Gesellschaft, vol. 34, (1901), page 1989. Substitution products thereof are obtainable in an analogous manner.

Our new compounds are generally yellowish crystalline substances of high melting point, insoluble in water, soluble in the usual organic solvents. Since the halogen can in turn be readily replaced by compounds containing a reactive hydrogen atom attached to a nitrogen, oxygen or sulfur atom, the new compounds thus obtainable form valuable intermediate products for the manufacture of dyestuffs and pharmaceutical substances.

The invention is illustrated by the following example, but is not restricted thereto:

Example.—33,9 parts by weight of 2.4-di-(nitrophenyl)-6-hydroxy-1.3.5-triazine (prepared by nitrating 2.4-diphenyl-1.3.5-triazine, position of the nitro groups unknown, melting point 280–281° C.) are heated for 8 hours with 10 times that quantity of phosphorus oxychloride under a reflux condenser. On cooling, the 2.4-di-(nitrophenyl)-6-chloro-1.3.5-triazine of the formula:

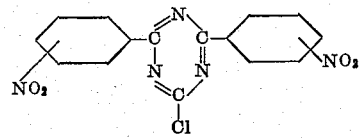

separates. It is filtered with suction; from the filtrate a further quantity can be obtained by concentration in vacuo. On recrystallization from xylene, the new compound is obtained in the form of small needles which melt at 180° C. The yield amounts to 90% of the theory.

We claim:

1. The process which comprises heating for several hours at a temperature between about 100 and 150° C. a 2.4-di-(nitrophenyl)-6-hydroxy-1.3.5-triazine with a phosphorus halide.

2. The process which comprises boiling for several hours a 2.4-di-(nitrophenyl)-6-hydroxy-1.3.5-triazine with a phosphorus chloride.

3. The process which comprises boiling for several hours a 2.4-di-(nitrophenyl)-6-hydroxy-1.3.5-triazine of the melting point 280–281° C., prepared by nitrating 2.4-diphenyl-6-hydroxy-1.3.5-triazine, with phosphorus oxychloride.

4. The 2.4-di-(nitrophenyl)-6-chloro-1.3.5-triazine (obtainable according to the process claimed in claim 3), being a yellowish crystalline substance of the melting point 180° C., being a valuable intermediate product in the manufacture of dyestuffs and synthetic drugs.

In testimony whereof, we affix our signatures.

WINFRID HENTRICH.
JOSEF HILGER.